United States Patent
Takagi et al.

(10) Patent No.: US 7,844,193 B2
(45) Date of Patent: Nov. 30, 2010

(54) MULTIFUNCTIONAL MACHINE AND METHOD OF CONTROLLING MULTIFUNCTIONAL MACHINE

(75) Inventors: Atsushi Takagi, Yokohama (JP); Hiroyuki Asanuma, Hiratsuka (JP); Naoto Takahashi, Hadano (JP)

(73) Assignee: Ricoh Company, Ltd., Tokyo (JP)

( * ) Notice: Subject to any disclaimer, the term of this patent is extended or adjusted under 35 U.S.C. 154(b) by 290 days.

(21) Appl. No.: 12/071,231

(22) Filed: Feb. 19, 2008

(65) Prior Publication Data

US 2008/0201585 A1  Aug. 21, 2008

(30) Foreign Application Priority Data

Feb. 16, 2007  (JP)  ............................ 2007-037110
Nov. 12, 2007  (JP)  ............................ 2007-293465

(51) Int. Cl.
*G03G 21/14* (2006.01)
*G03G 15/00* (2006.01)
*G03G 21/00* (2006.01)

(52) U.S. Cl. .............................. 399/77; 399/38; 399/75
(58) Field of Classification Search ................... 399/38, 399/70, 75, 76, 77
See application file for complete search history.

(56) References Cited

U.S. PATENT DOCUMENTS

| | | | | |
|---|---|---|---|---|
| 5,822,077 A | * | 10/1998 | Sasaki et al. | 399/38 X |
| 6,101,346 A | * | 8/2000 | Arakawa | 399/70 |
| 6,577,825 B1 | * | 6/2003 | Gonnella et al. | 399/38 |
| 7,142,122 B2 | * | 11/2006 | Butikofer et al. | 399/70 X |
| 7,593,291 B2 | * | 9/2009 | Ito | 399/77 X |
| 2001/0040704 A1 | * | 11/2001 | Kanno | 358/474 |

* cited by examiner

*Primary Examiner*—Sandra L Brase
(74) *Attorney, Agent, or Firm*—Harness, Dickey & Pierce, P.L.C.

(57) ABSTRACT

A multifunctional machine includes a first component section that starts up taking a first time period, and a second component section that starts up taking a second time period shorter than the first time period. An operation start prediction information obtaining section is provided to obtain operation start prediction information predicting a time when a user starts the multifunctional machine. A start up control section is provided to start up the first component section in advance of the second component section. A power supply control section is provided to supply power from at least one external power source and drive the start up control section in accordance with the operation start prediction information.

17 Claims, 14 Drawing Sheets

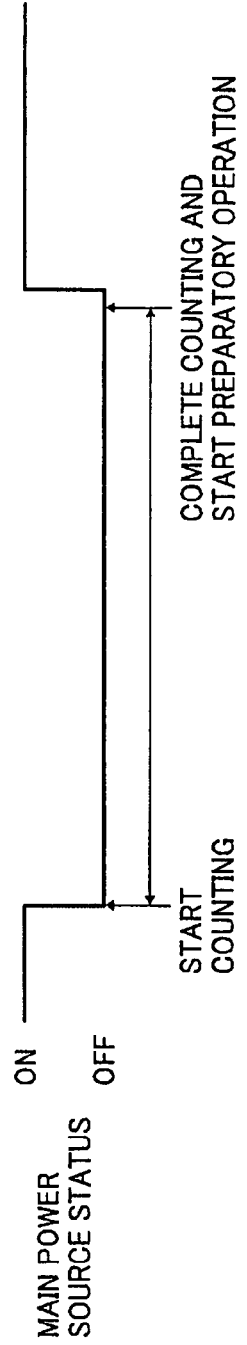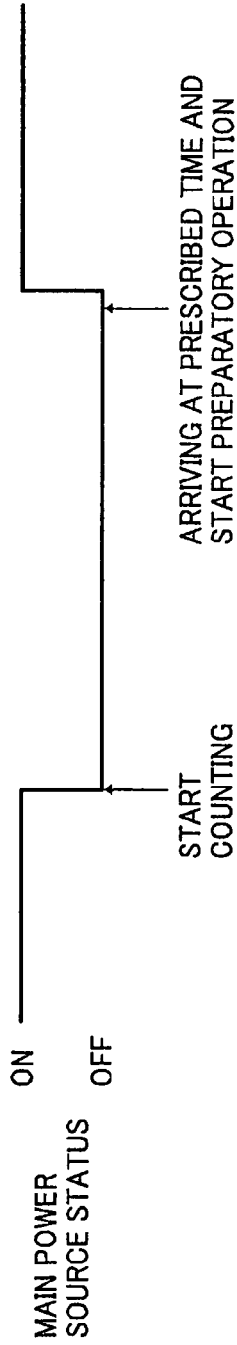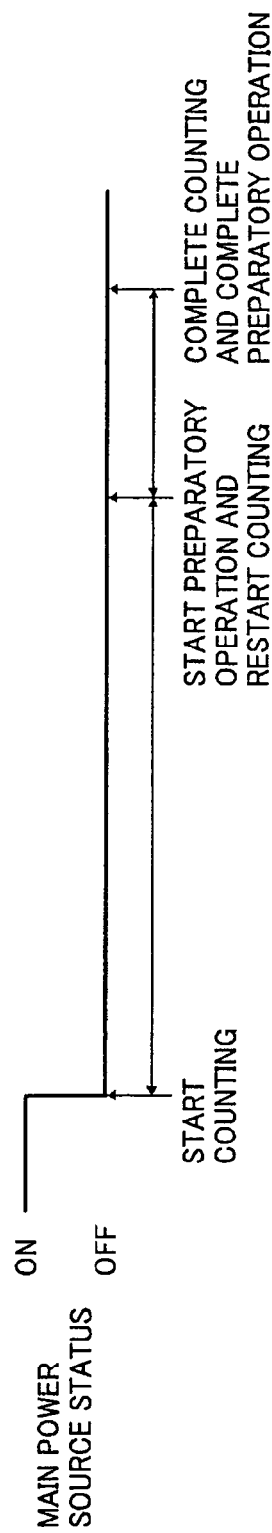

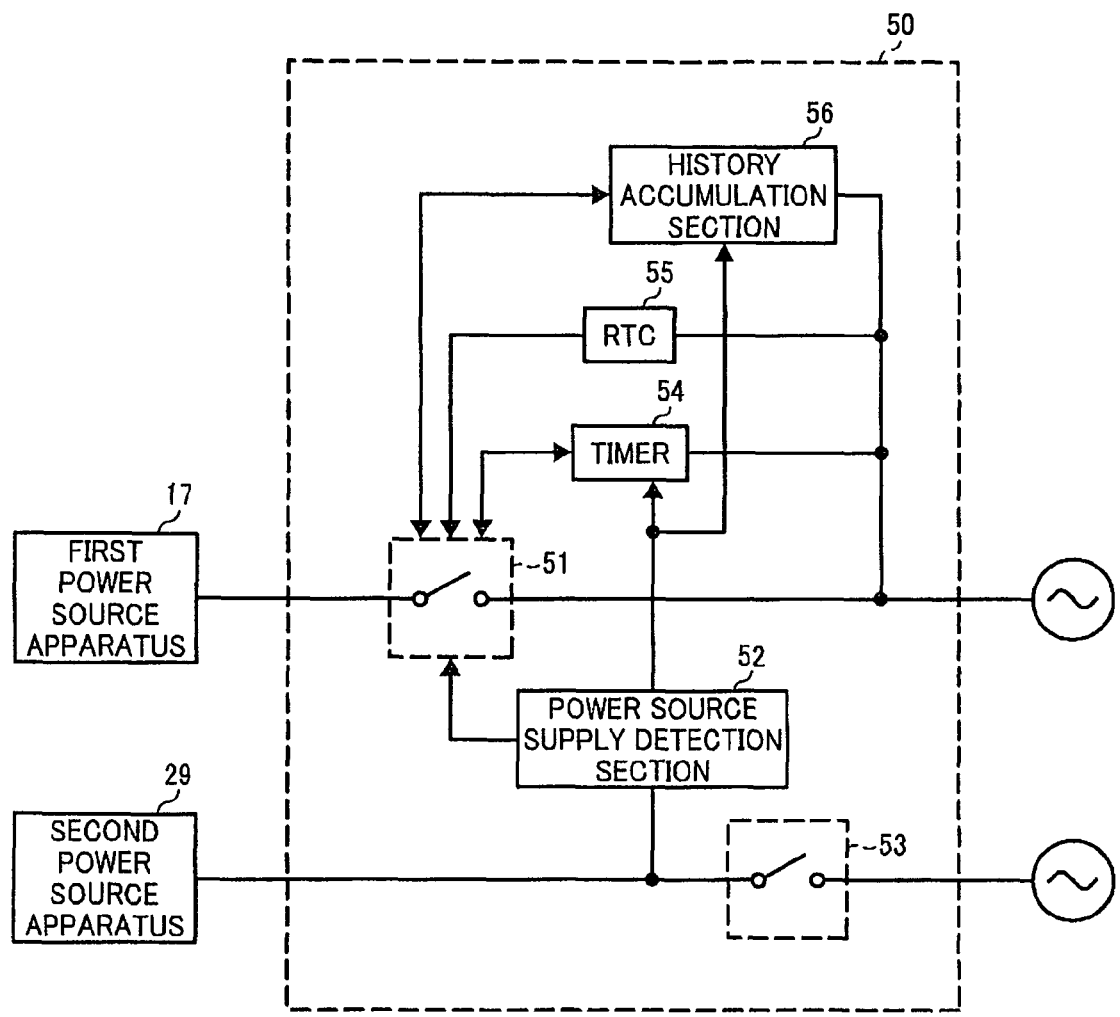

MULTIFUNCTIONAL MACHINE AND METHOD OF CONTROLLING MULTIFUNCTIONAL MACHINE

CROSS REFERENCE TO RELATED APPLICATIONS

This application claims priority under 35 USC §119 to Japanese Patent Application Nos. 2007-037110 and 2007-293465, filed on Feb. 16, 2007, and Nov. 12, 2007, respectively, the entire contents of which are herein incorporated by reference.

BACKGROUND

1. Field

Example embodiments relate to a digital multifunctional machine called a multifunctional periphery (MFP) configured by combining copying, facsimile-transmitting, printing, and scanning functions, and in particular, to such a digital multifunctional machine having sections taking short and long start up times and capable of improving user friendliness by reducing a waiting time.

2. Discussion of the Background Art

Currently, an image processing apparatus, such as a digital multifunctional machine called a multi-function peripheral (MFP) configured by combining copying, facsimile transmitting, printing, and scanning functions, is gaining popularity. Such a digital multifunctional machine is used by many users at optional time periods. Accordingly, when he or she intends to use the digital multifunctional machine, he or she sometimes has to wait a start up time period after a main power source is turned on.

For example, a conventional apparatus includes a function using a general purpose Operation System (OS) in addition to functions originally included in an image processing apparatus of a multi-function peripheral. Thus, several start-up processes are executed.

For example, a start up process of a multifunctional machine including a first component section that uses a multipurpose OS and a second component that exerts original functions of an image processing apparatus is shown in FIG. 14. For example, the second component section completes start up taking the time period T4 starting from the time $t_{11}$ to the time $t_{12}$. Whereas the first component section takes the time period T5 starting from the time $t_{11}$ to the time $t_{13}$ to complete start up. Thus, the time period T5 corresponding to the time taken by the slower component is needed.

For example, in the conventional apparatus, the section capable of starting up fast needs to wait for the section starting up late before totally becoming ready to operate and causes the operator to wait a long time.

Another conventional apparatus can hurry up a start up process. However, since electric power should be the same level during start up processing as during a normal operation, preparation of the start up is costly.

Another conventional apparatus reduces a start up time using a hibernation function. However, a built in use OS sometimes does not include the hibernation function, and cannot reduce the startup time period.

Another conventional apparatus can hurry up a start up process of a section handling a user operation.

However, a total speed up to a process end is not improved. For example, neither the entire startup time period nor an execution processing time period is not reduced. In addition, since dependency relations of the entire module of the system need to be memorized, it takes cost to create and manage such information.

Another conventional apparatus can minimize a startup time period only for a prescribed function (e.g. copying). However, it still needs a certain typical startup time period and does not improve considering the total start up time when functions of the system are entirely used.

For example, in the multi-function peripheral having a wide range of multi-functions, a memory apparatus such as a hard disc installing a multifunctional Operation System is initially started up to exert the functions. Such a configuration likely takes a longer time period for starting the Operation System in comparison to a conventional MPF including conventional functions. In particular, when a multifunctional Operation System section takes a longer time than a section realizing conventional functions, such as a printing apparatus, an image reading apparatus, etc, a time period from when the multi-function multifunction peripheral is turned on to when it becomes available is relatively longer than when the conventional multi-function peripheral is utilized.

SUMMARY

Accordingly, at least one example embodiment provides a multifunctional machine. Such a multifunctional machine includes a first component section that starts up taking a first time period, and a second component section that starts up taking a second time period shorter than the first time period. An operation start prediction information obtaining section is provided to obtain operation start prediction information predicting a time when a user starts the multifunctional machine. A start up control section is provided to start up the first component section in advance of the second component section. A power supply control section is provided to supply power from at least one external power source and drive the start up control section in accordance with the operation start prediction information.

In at least one example embodiment, the first component section operates in a normal condition and a power save condition. The power save condition consumes less power than the normal condition. The start up control section controls the first component section to operate in the power save condition when driven in accordance with the operation start prediction information.

In at least one example embodiment, the operation start prediction information obtaining section obtains a clock time as the prediction information. The power supply control section starts supplying power and drives the start up control section at a prescribed time determined based on the clock time.

In at least one example embodiment, the prescribed time corresponds to a time when a main power is inputted by the user to the multifunctional machine.

In at least one example embodiment, a power supply start history accumulation section is provided to accumulate information indicating a power supply time when the power is supplied to one of the first and second component sections. The operation start prediction information obtaining section obtains a clock time as the operation start prediction information, and the power supply control section supplies power and drives the startup control section based on one of the clock time and the power supply time.

In at least one example embodiment, a start up timer is provided to start counting in response to stop of supplying power to one of the first and second component sections and transmits a count completion signal when completed counting for a prescribed time period. The operation start prediction information obtaining section obtains the count completion signal as the operation start prediction information.

In at least one example embodiment, a human body detection section is provided to detect human body at around the multifunctional machine and transmits a human body detection signal. The operation start prediction information obtaining section obtains the human body detection signal as the operation start prediction information.

In at least one example embodiment, a voice detection section is provided to detect voice at around the multifunctional machine and transmits a voice detection signal. The operation start prediction information obtaining section obtains the voice detection signal as the operation start prediction information.

In at least one example embodiment, a network communication condition detection section is provided to detect a network communication condition and transmits a network communication signal. The operation start prediction information obtaining section obtains the network communication signal as the operation start prediction information.

In at least one example embodiment, the multifunctional machine performs image formation upon receiving a printing job, and the network condition detection section transmits the network communication signal by detecting the printing job inputted to the multifunctional machine.

In at least one example embodiment, a luminance detection section is provided to detect a luminance at around the multifunctional machine and transmits a luminance detection signal. The operation start prediction information obtaining section obtains the luminance signal as the operation start prediction information.

In at least one example embodiment, a power detection section is provided to detect a change in power of the external power source and transmits a power change detection signal. The operation start prediction information obtaining section obtains the power change detection signal as the operation start prediction information.

In at least one example embodiment, a temperature detection section is provided to detect a change in temperature at around the multifunctional machine and configured to transmit a temperature change detection signal. The operation start prediction information obtaining section obtains the temperature change detection signal as the operation start prediction information.

In at least one example embodiment, a stop control section is provided to stop the operation of the first component section when the second component section is not operated when a prescribed time has elapsed after the first component section starts up.

In at least one example embodiment, a stop control section is provided to stop the operation of the first component section when the second component section is not operated when a prescribed time has elapsed after the first component section starts up. The stop control section obtains a clock time and said prescribed time is determined based on the clock time.

In at least one example embodiment, a stop control section is provided to stop the operation of the first component section when the second component section is not operated when a prescribed time has elapsed after the first component section starts up. A power supply start history accumulation section is provided to accumulate a start time when power supply is started to one of the first and second component sections. The stop control section obtains a clock time and the prescribed time is determined based on one of the clock time and the start time.

In at least one example embodiment, a stop timer is provided to start counting in response to the start of the first component section and configured to stop and transmit a stop count completion signal when completed counting for a prescribed time period. The stop control section stops operation of the first component section based on the stop count completion signal.

BRIEF DESCRIPTION OF DRAWINGS

A more complete appreciation of example embodiments and many of the attendant advantages thereof will be readily obtained as the same becomes better understood by reference to the following detailed description when considered in connection with the accompanying drawings, wherein:

FIGS. 6A to 6C collectively illustrate an operation of the digital multifunctional machine according to example embodiments;

FIG. 7 illustrates another power source control section according to example embodiments;

DESCRIPTION OF EXAMPLE EMBODIMENTS

Figure 1:
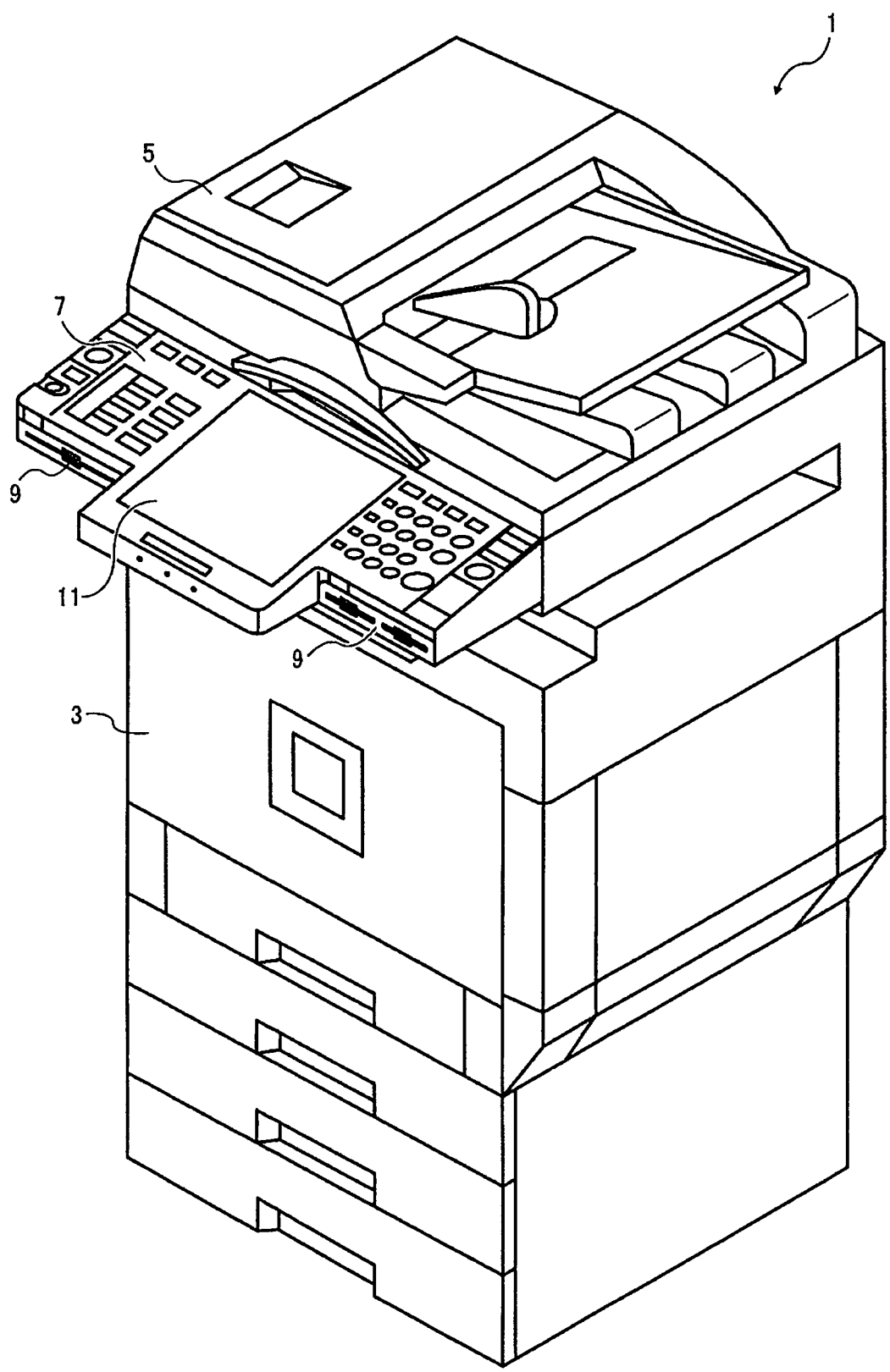
FIG. 1 illustrates a digital multifunctional machine according to example embodiments.

Referring now to the drawing, wherein like reference numerals designate identical or corresponding parts throughout several views, in particular, in FIG. 1, a digital multifunction machine 1 includes a printing section 3 for forming an image, an image reading section 5 for reading an image, an operation section 7 for accepting operational input, and/or a memory section 9 for storing document information.

The operation section 7 includes a display for information display use equipped with a touch panel for inputting. A slot can be employed in the operation section 7 for accepting insertion of an external media.

Figure 2:
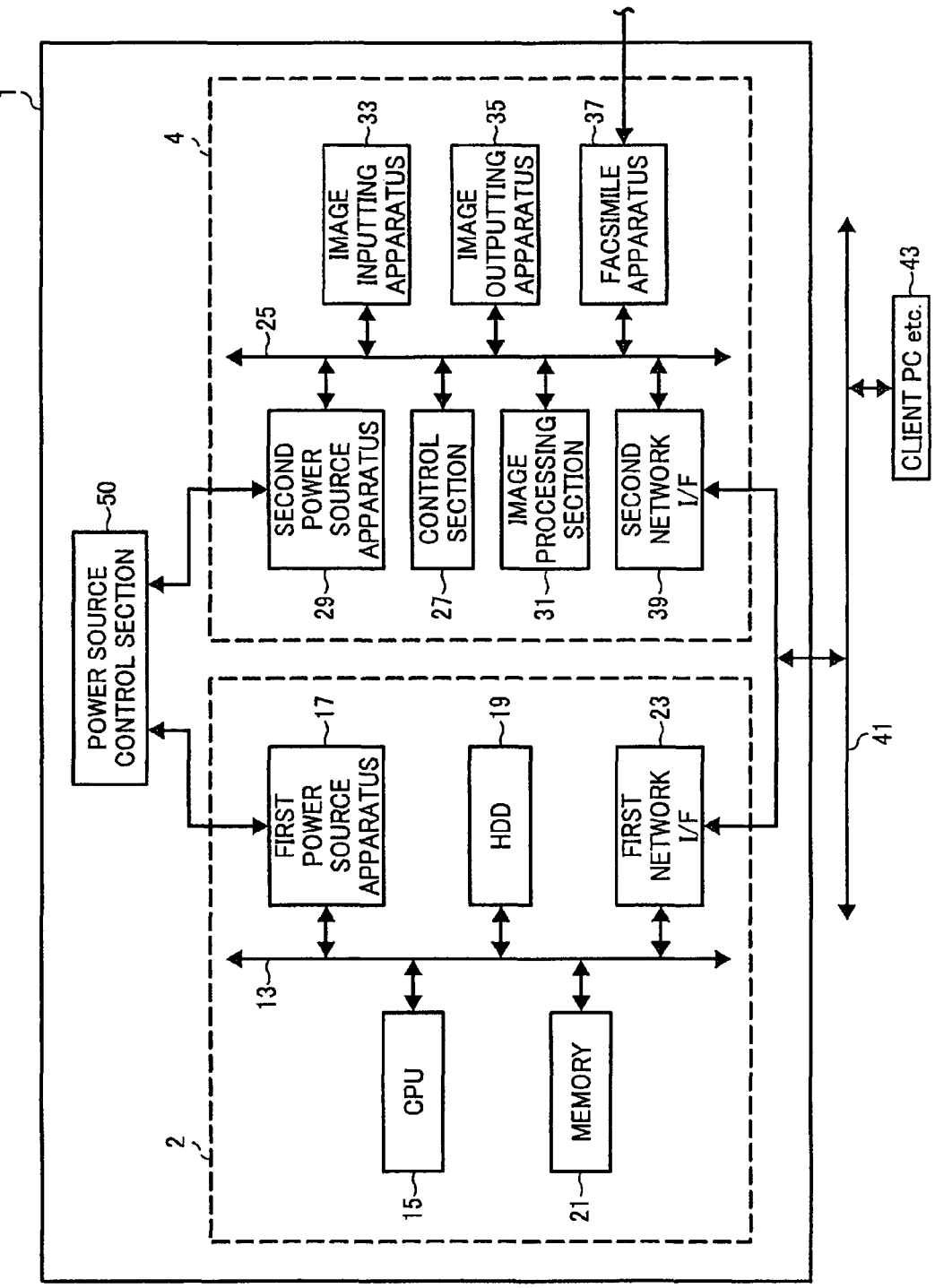
FIG. 2 illustrates an example interior of the digital multifunctional machine of FIG. 1.

As shown in FIG. 2, an interior of the digital multifunction machine 1 is separated into a first component section 2 necessitating a longer start up time period and a second component section 4 necessitating a shorter start up time period than the first component. Different electric control systems are employed to separately control these sections independently.

In such a first component section 2, a CPU 15 for general control use, a first power source apparatus 17, a HDD (Hard Disc Drive) 19, a memory 21, and/or a first network interface 23 are connected to each other via a first internal bus 13. In such a second component section 4, a control section 27, a second power source apparatus 29, an image processing section 31, an image inputting apparatus 33, an image outputting apparatus 35, a facsimile apparatus 37, and/or a second network interface 39 are connected to each other via a second internal bus 25. Further, the digital multifunctional machine 1 according to at least one example embodiment includes a power source control section 50 that controls the first and second power source apparatuses 17 and 29.

Due to the function of the power source control section 50, the first and second power source apparatuses 17 and 29 operate working with each other. These first and second power source apparatuses 17 and 29 respectively start up the first and second component sections 2 and 4, separately. The first and second network interfaces 23 and 39 are connected to a client personal computer (PC) 43 via a LAN (Local Area Network) 41.

Figure 3:
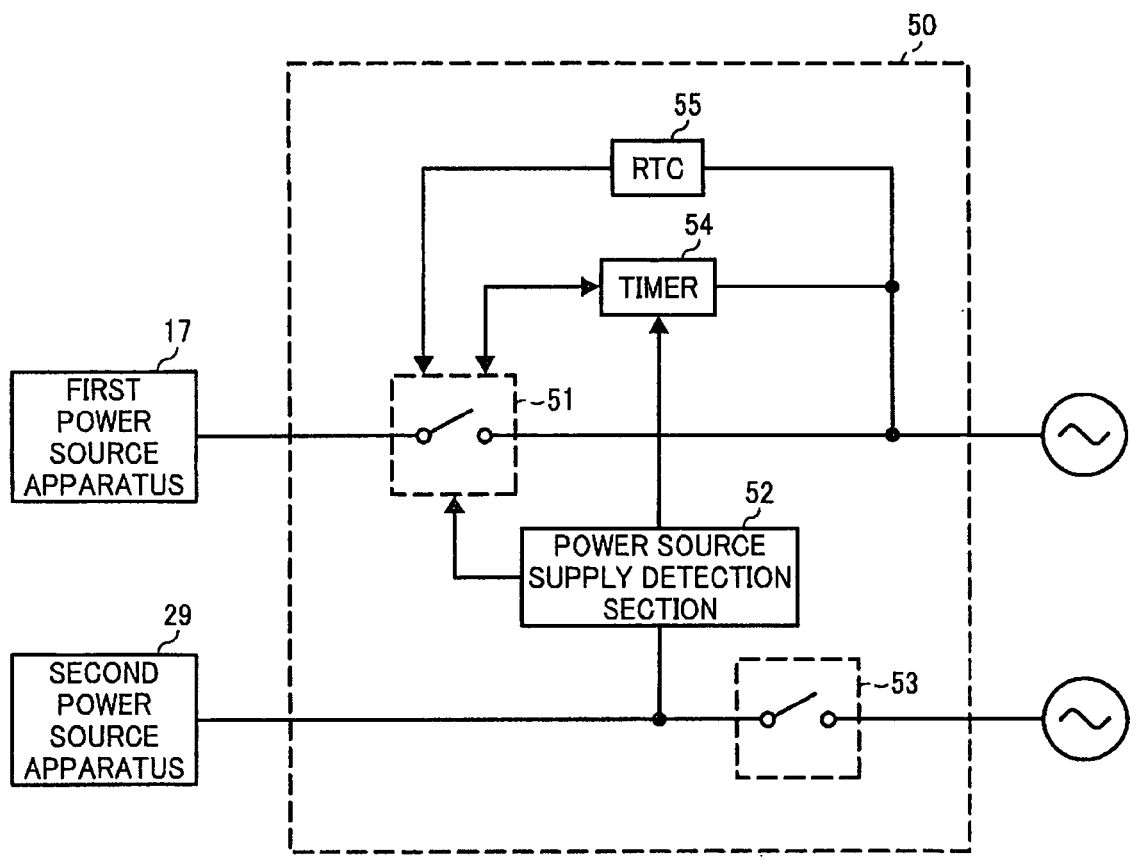
FIG. 3 illustrates a power source control section according to example embodiments.

With reference to FIG. 3, the power source control section 50 is described in more detail. As shown, the power source control section 50 includes a first switch 51, a power source supply detection section 52, a second switch 53, a timer 54, and a real time clock (RTC) 55. The first switch 51 is switched between supply and shut off states for supplying and stopping supply of an external power source to the first power source apparatus 17. The power source supply detection section 52 detects start and stop of supplying an external power source to the second power source apparatus 29.

The second switch 53 is switched between supply and shut off states for supplying and stopping supply of the external power source to the second power source apparatus 29. For example, the second switch 53 is switched between turn off and on states by an operator when he or she uses a mechanical switch arranged on the digital multifunctional machine 1. For example, the second switch 53 also functions as a main power source for the digital multifunctional machine 1. The power source supply detection section 52 detects start of supplying the external power source to the second power source apparatus 29, and inputs a supply start detection signal indicating the start of supplying the power source to the switch 51. Upon receiving the supply start detection signal from the power source supply detection section 52, the switch 51 is switched to supply the external power source to the first power source apparatus 17. When detecting stop of supplying the external power source to the second power source apparatus 29, the power source supply detection section 52 inputs a supply stop detection signal indicating stop of supplying the power source to both of the switch 51 and the timer 54. Upon receiving the supply stop detection signal from the power source supply detection section 52, the switch 51 is switched to stop supplying the external power source to the first power source apparatus 17.

The timer 54 starts counting in response to the stop of supplying the external power source to the second power source apparatus 29. When a prescribed time period is counted after start of counting, the second power source apparatus 29 inputs a count completion signal indicating completion of the counting to the first switch 51. Upon receiving a signal from the timer 54, the first switch 51 is switched to supply the external power source to the first power source apparatus 17. For example, the timer 54 functions as a start timer for counting a time until the first component section starts up. The RTC 55 inputs a real clock time to the first switch 51. The first switch 51 obtains the real time information from the RTC 55, and is switched to supply the external power source to the first power source apparatus 17 at a prescribed clock time.

Further, the external power source is supplied to the timer 54 and the RTC 55 regardless of the conditions of the first and second switches 51 and 53. The timer 54 and the RTC 55 can be operated by a power source of a built in battery other than the external power source. Thus, in the power source control section 50, the first switch 51 starts supplying the external power source to the first power source apparatus 17 one of when the signal is inputted from the timer 54 or the RTC 55 and when the power source is supplied to the second power source apparatus 29.

Now, a start up operation of a digital multifunction machine according to example embodiments is described with reference to FIGS. 1 and 2.

The digital multifunction machine of FIGS. 1 and 2 includes a function to enter a power saving mode (e.g. a suspended mode in a typical PC) when an OS is turned on. This function is used in a start up time period. For example, the function causes the first component section 2 to enter and return from the power save mode to the original mode when the first component section 2 is separately started up by the first power supply apparatus 17. Because, the first component section 2 spends a lot of power.

In the power save mode, power is stopped supplying to the first component section 2 while holding an operating state of an apparatus in a memory 21. Thus, power consumption can be suppressed more than usual. Further, since the information of the operating state is held in the memory 21, the apparatus can return faster to an operable state than ordinary start up.

Figure 4A:
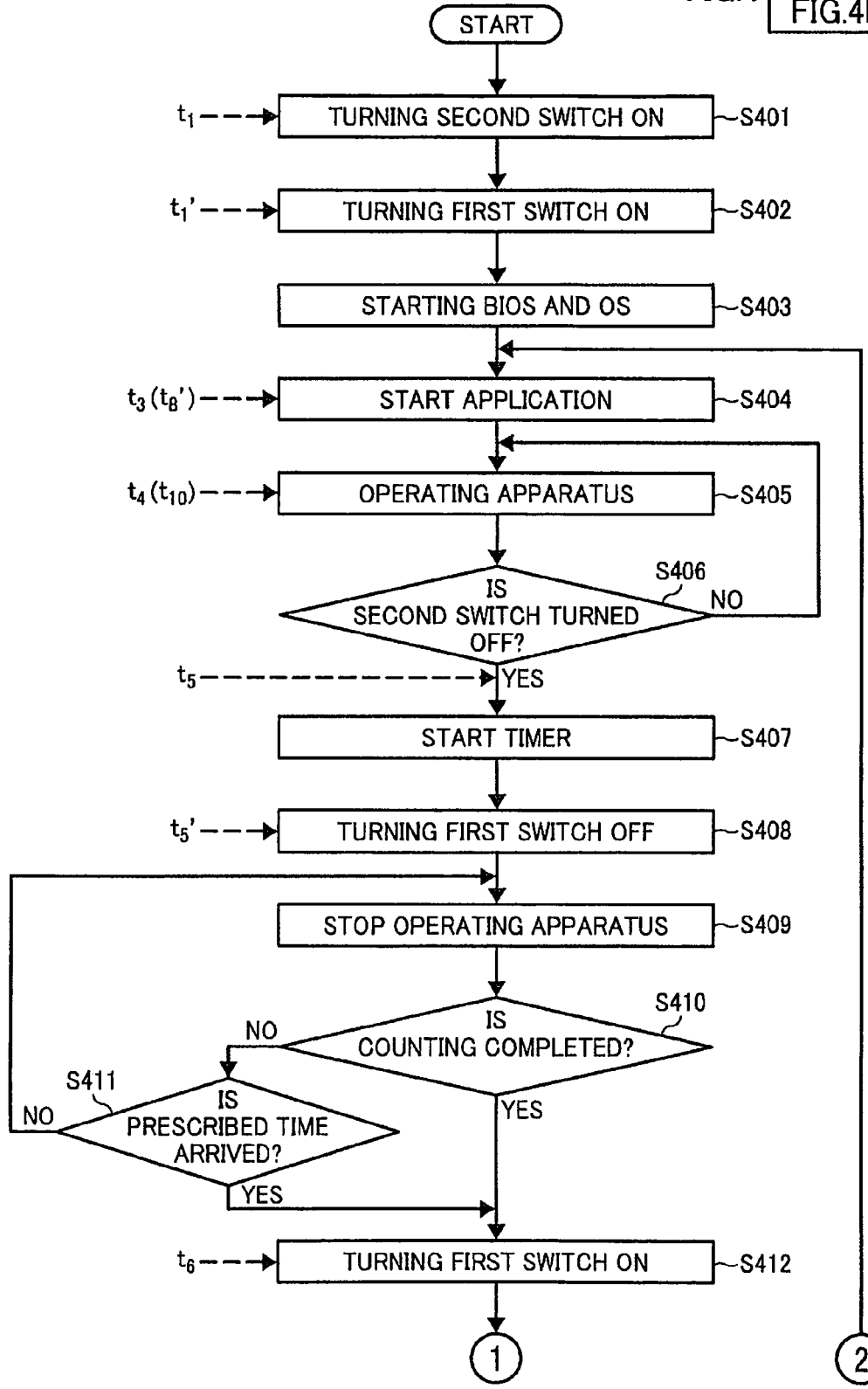
FIGS. 4A and 4B collectively illustrate a sequence when the digital multifunctional machine starts up according to example embodiments.
Figure 4B:
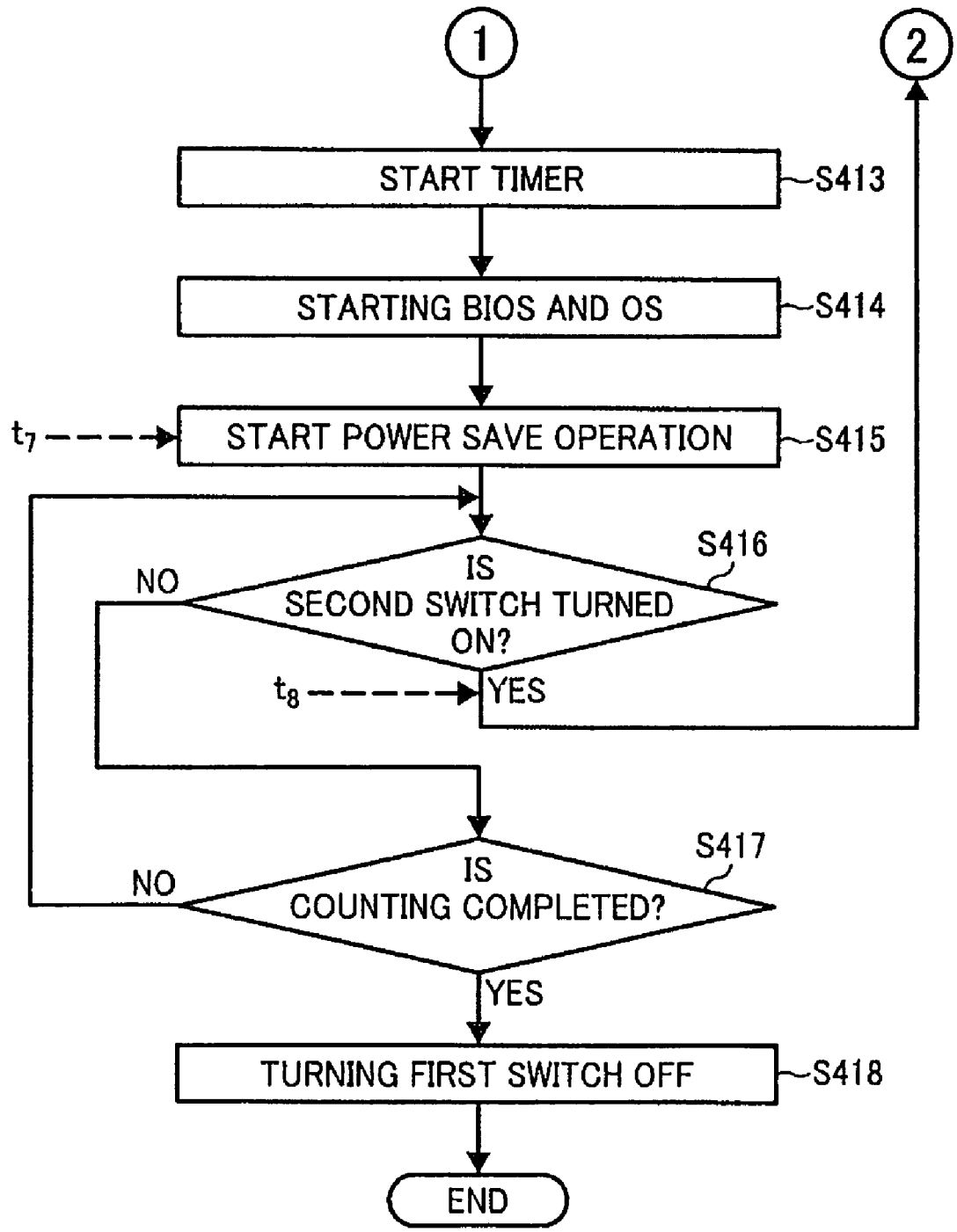

Now, a start up operation of the digital multifunctional machine 1 is described with reference to FIGS. 4 and 5. When an operator operates a mechanical switch arranged on the digital multifunctional machine 1, the second switch 53 is tuned on at the time t1 at S401 and the external power source is started supplying to the second power source apparatus 29. When the external power source is started supplying to the second power source apparatus 29, the power source supply detection section 52 inputs a detection signal to the first switch 51, and turns on the first switch 51 at the time t1' at S402.

These times t1 and t1' are different in a strict sense. However, since the first switch 51 is turned on in response to turning on of the second switch 53, a difference therebetween is an extraordinary small.

Due to the turning on of the second switch 53, the second component section 4 starts up at the time t1, and completes the start up at the time t2 when the time period T3 has elapsed. Owing to the turning on of the first switch 51, the first component section 2 starts up at the time t1'. When the CPU 15 and the memory 21 or the like operate in the first component section 2, BIOS and OS are initially started up at S403. Start up of the BIOS and OS is completed when BIOS and OS program stored in a HDD 19 or a read only memory (ROM), not shown, are loaded in a memory 21 and start operation under control of the CPU 15.

When the start up of the BIOS and OS is completed at the time t3, the first component section 2 starts application for operating each of sections of the digital multifunctional machine 1 at S404. Similar to those of the BIOS and OS, start up of the application is completed when application program stored in a HDD 19 or the like is loaded in the memory 21, and the application program starts running under control of the CPU 15. When the time T1 has elapsed from the time t1 and the application completes starting up at the time t4, the digital multifunctional machine 1 becomes an operation state at the time t4 at S405.

Figure 5:
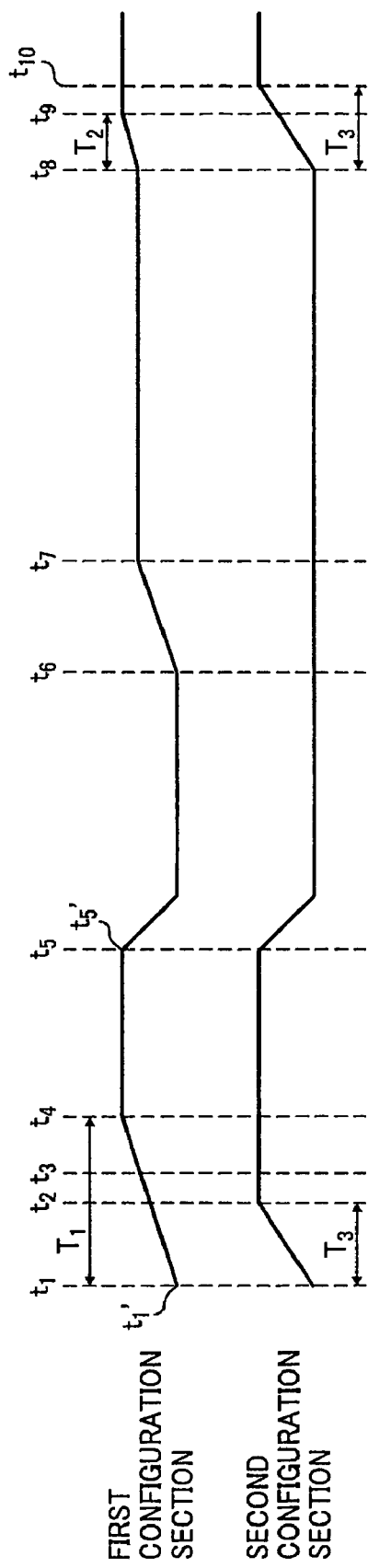
FIG. 5 illustrates an example time chart when the digital multifunctional machine starts up.

As shown in FIG. 5, the time period T1 is longer than the time period of T3. Because, it takes a longer time to start up the BIOS, the OS, and the application. The time period T1 is generally about three minutes. Whereas the time period T3 is about one minute. Thus, the digital multifunctional machine 1 is not yet available when the second component section 1 completes start up at the second time t2, because the first component section 2 does not complete start up.

When becoming an operable state at the time t4 and the operator operates the mechanical switch, the digital multifunctional machine 1 is operable until the second switch 53 is turned off (No, at S406). During the operable condition of the digital multifunctional machine 1, power save control is executed as mentioned above. For example, one of normal operation and power save conditions is selected in accordance with an operational condition of the digital multifunctional machine 1.

When the operator operates the mechanical switch, and the second switch 53 is turned off at the time t5 (Yes, at 406), the power source supply detection section 52 inputs a supply stop detection signal to both of the first switch 51 and the timer 54. The timer 54 starts counting in response to the supply stop detection signal inputted by the power source supply detection section 52 at S407. The first switch 51 is turned off at the time t5' upon receiving the supply stop detection signal at S408. These times t5 and t5' are different in a strict sense. However, since the first switch 51 is turned off in response to turning off of the second switch 53, a different therebetween is small.

Owing to turned off of the first switch 51, the external power source is stopped supplying to first power source apparatus 17, and accordingly, the first component section 2 stops functioning. Owing to turned off of the first switch 53, the external power source is topped supplying to second power source apparatus 29, and accordingly, the second component section 2 stops functioning. As a result, the digital multifunctional machine 1 stops functioning at S409.

As mentioned heretofore, the timer 54 receives the power source from both of the first and second power source apparatuses 17 and 29, independently, and continues counting even when the digital multifunctional machine 1 stops its operation. The RTC 55 also receives the power source and inputs real clock time to the first switch 51.

When the digital multifunctional machine 1 stops its operation, and either the timer 54 completes counting for a prescribed time (Yes, at S410) and inputs a count completion signal to the first switch 51, or a clock time notified to the first switch 51 by the RTC 55 arrives at a prescribed level (Yes, at S411) before the timer 54 completes prescribed counting (No, at S410), the first switch 51 is switched to supply the external power source to the first power source apparatus 17 in response to these signals at the time $t_6$ at S412.

Owing to turning on of the first switch 51 at S412, the external power source is supplied to first power source apparatus 17, and accordingly the first component section 2 starts up.

When the switch is turned on in accordance with either the count completion signal inputted by the timer 54 or the clock time signal inputted by the RTC 55, the first switch 51 resets and restarts the timer 54 at S413.

When started, the first component section 2 starts the BIOS and the OS in the same manner as mentioned above at S414. When completing the start up of the BIOS and the OS, the first component section 2 does not start up all of applications unlike an ordinary start up process. For example, the first component section 2 partially starts up the application in a power save condition at the time t7 at S415. For example, the first power source apparatus 17, the CPU 15, and the memory 21 collectively function as a start up processing section.

As start up in the power save condition, initial setting for application and a service start operation are executed. When the first component section 2 starts up in the power save condition, and an operator operates the mechanical switch, and thereby the second switch turns on (Yes, at S416), the external power source is supplied to the second power source apparatus 29, and the second component section 4 starts up at the time t8.

The second component section 4 then starts transition from the power save operation to the normal operation conditions at the time t8'.

The OS or the application operating in the first component section 2 controls such transition. The transition can be triggered either when the power source supply detection section 52 detects start of supplying the external power source to the second power source apparatus 29 or when the OS or the application detects start up of the second component section 4.

During the transition from the power save to normal operation conditions, it is enough for the first component section 2 only to start application at S404. Whereas, the second component section 4 executes ordinary start up, and the digital multifunctional machine 1 becomes operable at the time t10 at S405.

As shown in FIG. 5, when the operator operates the mechanical switch, and thereby the digital multifunctional machine 1 starts up at the time t8, the second component section 4 completes start up at the time t10 when a time period T3 has elapsed after the time t8 because of execution of the ordinary start up. Whereas the first component section 2 completes start up at the time t9 when a time period T2 has elapsed after the time t8, because it is enough to start up the application unlike the ordinary start up.

The time period T2 is shorter than the time period T3 as shown. This is because, different from the ordinal start up, start up of the BIOS and OS, initial setting for application, and the start up of application already started up are not needed.

Thus, when the operator operates the mechanical switch, and the apparatus starts up at the time t8, the apparatus completes the start up in the time period T3 shorter than the time T1, which is needed for ordinary start up. Accordingly, a time from when the operator operates a main power source of the digital multifunctional machine 1 to when the digital multifunctional machine 1 becomes available by completing the start up can be reduced.

Whereas the digital multifunctional machine 1 starts up in the power save operation condition at the time t7 at S414 when the timer 54 starts counting at S415 and counted up for a prescribed time period (Yes, at S417) before the second switch is turned ON (No, at S416), the timer 54 inputs a count up signal to the first switch 51. Thus, the first switch 51 is turned off at S413, thereby stopping the operation of the first component section 2. For example, the first switch 51 serves as a stop processing section for stopping the first component section 2. The timer 54 serves as a stop timer for counting for a prescribed time period until the second component section 2 stops operation. As a result, the first component section 2 does not maintain the power save condition and thereby the power is not wasted when the digital multifunctional machine 1 is not used.

Thus, when the timer 54 completes counting for the prescribed time period after the main power source (e.g., the second switch 53) is turned off, and the digital multifunctional machine 1 stops operation, the first component section 2 starts up under control of the OS. When the timer 54 does not complete counting for the prescribed time period, but elapse of a prescribed time is detected, the first component section 2 similarly starts up.

This can be a preparatory start up predicting that the main power source of the digital multifunctional machine 1 is turned on shortly. In other words, that is a standby processing, in which the first switch 51 controls the first component section 2 to start up and is standby before the second component section starts up by obtaining a signal from the timer 54 or the RTC 55 as information predicting that the digital multifunctional machine 1 starts operation. For example, the first switch 51 serves as an operation start prediction information obtaining section and a power source supply section for supplying an external power source to the first power source apparatus 17.

Now, an operation of a digital multifunctional machine 1 according to at least one example embodiment is more specifically described with reference to FIGS. 6A to 6C. A digital multifunctional machine 1 is turned off at an office when a business is finished in a day. A main power source is turned on the next day before a business starts. An interval between times when the main power source is turned off and on is almost the same every time. Accordingly, by decreasing a time period counted by the timer 54 less than the interval, and executing preparatory start up in the first component section before the digital multifunctional machine 1 is turned on the next day, the time period from when the main power source is turned on to when the apparatus becomes available can be reduced.

Further, a time to turn on a digital multifunctional machine 1 is subject to a time to start a business. Accordingly, a time when the first switch 51 is turned on by a time notification signal transmitted from the RTC 55 is preferably set before the office starts the business. Thus, as shown in FIG. 6A, preparatory start up is executed in the first component section 2 before the main power source of the digital multifunctional machine 1 is turned on after the business starts. Thus, an interval between times when the main power source is turned on and when the digital multifunctional machine 1 becomes available can be reduced. Such an operation may be preferable, for example, when the counter starts with a delay because the business is finished late on the day before. Further, a time when the first switch 51 is turned on by the time notification signal from the RTC 55 can be set optionally. Then, a time when the digital multifunctional machine 1 starts preparatory star up can be set in accordance with a business hour in the office. As a result, standby power is not wasted.

Generally, a multifunctional machine 1 is not used at an office on holidays or the like. A preparatory start up condition increases waste of power consumption if continued. Then, according to a power source control section 50 of at least one embodiment, the timer 54 restarts counting at S415 either when completing counting at S410 or when a prescribed clock time is arrived at S411, and when the preparatory start up is commenced at S414 as shown in FIG. 6C. The preparatory start up is completed at S416 and the digital multifunctional machine 1 completely stops operation when the timer 54 completes counting for a prescribed time period (Yes, at S417) before the main power source is tuned on (No, at S416). Thus, a valid time period for preparatory start up performed by the digital multifunctional machine 1 can be determined, while preventing a wasteful preparatory start up condition and thereby decreasing power consumption.

As mentioned heretofore, according to at least one embodiment of the power source control section 50, a waiting time for a digital multifunctional machine 1 including sections taking long and short start up time periods is reduced while improving usability.

The above-mentioned start up and power save control in the first component section 2 is executed by the first and second power source apparatuses 17 and 29 via the power source control section 50 under control of the CPU 15. For example, the CPU 15, the power source control section 50, and the first and second power source apparatuses 17 and 29 collectively constitute a power source control device.

In the above-mentioned description, the power save condition is used as a preparatory start up in which only the first component section is operated. Thus, a standby power needed from when the digital multifunctional machine 1 preparatory starts up to when the main power source is supplied can be reduced. The first component section 2 can be started up as a preparatory operation.

In such a situation, regardless of transition from power save to operation conditions in the first component section 2, the digital multifunctional machine 1 becomes operable only by starting up the second component section 4. The first component section 2 can enter the power save condition after starting up.

As described with reference to S407, when the power source for the digital multifunctional machine 1 is turned off, the timer always starts counting at S407 and completes either by counting for a prescribed time period or a prescribed time has been reached.

However, a preparatory setting section can be employed in the power source control section 50 to determine if a preparatory start up is executed. For example, the power source control section 50 only executes the preparatory start up when execution of preparatory start up is designated. Thus, wasteful preparatory start up in the digital multifunctional machine 1 at the office on holidays can be avoided, and thereby standby power is not wasted.

As mentioned above, the valid time period of the preparatory start up, in which the first component section 2 becomes standby in the power save condition for preparation of starting the second component section 2, can be recognized by the timer 54 at S415 to S417.

However, a real clock time can be set to the first switch 51 as the valid time period. For example, the first switch 51 is switched to stop power supplying from the external power-source to the first power source apparatus 17 when the first component section 2 executes preparatory start up upon receiving a signal from either the timer 54 or the RTC 55 and when a real clock time notified by the RTC 55 arrives at a prescribed setting level before the second component section 4 operates. Thus, the real clock time can be directly set as the preparatory start up time.

Further, the above-mentioned start up time or the valid time period for preparatory start up can be scheduled. For example, clock times for executing and terminating preparatory start up per day of the week or day can be set and memorized in the first switch 51. Thus, considering holidays or the like, an interval between power save conditions can efficiently be decreased. Accordingly, power consumption can be further reduced.

The above-mentioned count time counted by the timer 54 and the clock time notified by the RTC 55 can be set via the operation section 7 of FIG. 1. Accordingly, the preparatory start up time and the valid time period for preparatory start up can be optionally set. Thus, the time period can be decreased and power consumption can be reduced. A client PC 43 via a LAN 41 can set the start up time and the valid time period. In such a situation, since both of the starting and ending times of the preparatory start up in the first component section 2 is externally set via the network, it is unnecessary to approach the apparatus.

In the above-mentioned description, the RTC 55 is provided and the switch 51 executes determination based on the real clock time therefrom. However, such operations can be executed based on a unique time timed in the digital multifunctional machine 1 different from the real clock time, and the same result can be obtained.

As mentioned above, the preparatory start up executed in the first component section 2 is controlled based on the signal from either the timer 54 or the RTC 55. Such an operation attempts to predict a time when a main power source is inputted to the digital multifunctional machine 1, and thereby decreasing a waiting time for the digital multifunctional machine 1 after the main power source is inputted thereto. For example, preparatory start up is executed in the first component section 2 beforehand.

However, various times can control the first power source apparatus 17 to execute preparatory start up beside the signal transmitted from either the timer 54 or the RTC 55 as far as the time predicts when the main power source is inputted to the digital multifunctional machine 1.

Another example power source control section 50 is now described with reference to FIG. 7. As shown, a history of turning on/off of the switch 53 under the control of the power source supply detection section 52 is accumulated in a history accumulation section 56. For example, the history accumulation section 56 stores a latest clock time when the main power source of the digital multifunctional machine 1 is lastly inputted upon receiving a detection signal from the power source supply detection section 52. Then, the history accumulation section 56 calculates and reports to the first switch 51 a start time for causing the first component section 2 to execute preparatory start up based on the latest clock time. When a clock time notified by the RTC 55 arrives at the start time notified by the history accumulation section 56, the first switch 51 starts supplying an external power source to the first power source apparatus 17, thereby causing the first component section to execute the preparatory start up. Such control is efficient, when the time for starting up the digital multifunctional machine 1 is almost the same every day.

The history accumulation section 56 can store not only the latest time but also a past history thereof. Thus, it is possible to determine a time for executing preparatory start up in the first component section 2 based on the earliest time among the past history. It is also possible to determine the valid time period based on the earliest time. For example, if the latest clock time in a day has elapsed, it is understood that the digital multifunctional machine 1 is not started in the day. It is also determined that the preparatory start up of the first component section 2 is to be completed.

Figure 8:
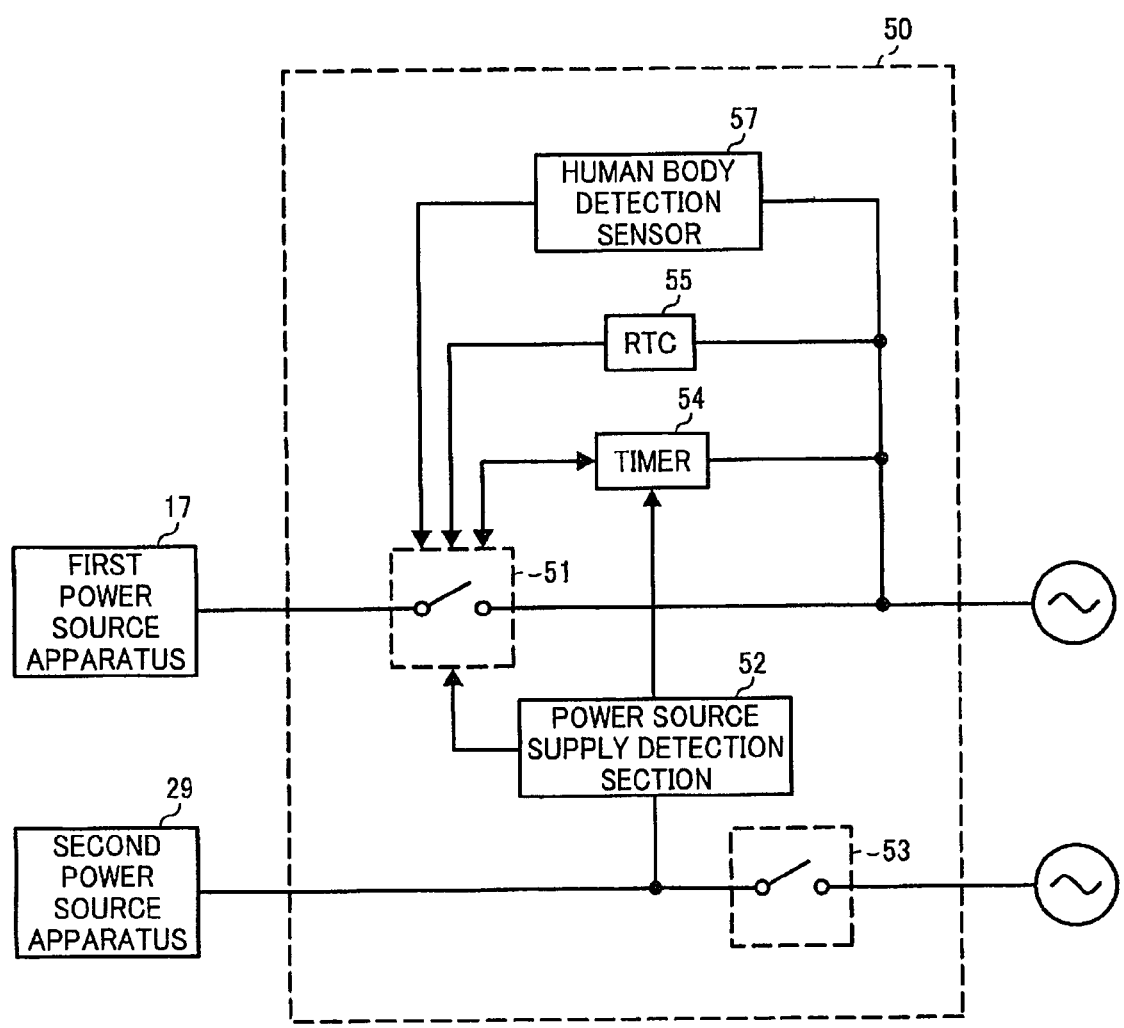
FIG. 8 illustrates still another power source control section according to example embodiments.

Still another example power source control section 50 is described with reference to FIG. 8. As shown, a human body detection sensor 57 is provided to detect human body at around the digital multifunctional machine 1. The human body detection sensor 57 generates and inputs a human body detection signal to the first switch 51 when detecting the human body at around the digital multifunctional machine 1. The first switch 51 starts supplying the external power source to the first power source apparatus 17 and causes the first component section 2 to execute preparatory start up upon receiving the human body detection signal. When the digital multifunctional machine 1 is used at an office, the main power source is inputted after am employee comes to work. For example, by using the human body detection sensor 57 and detecting the employee at the work as shown in FIG. 8, a time when the main power source is inputted to the digital multifunctional machine 1 can be predicted.

Figure 9:
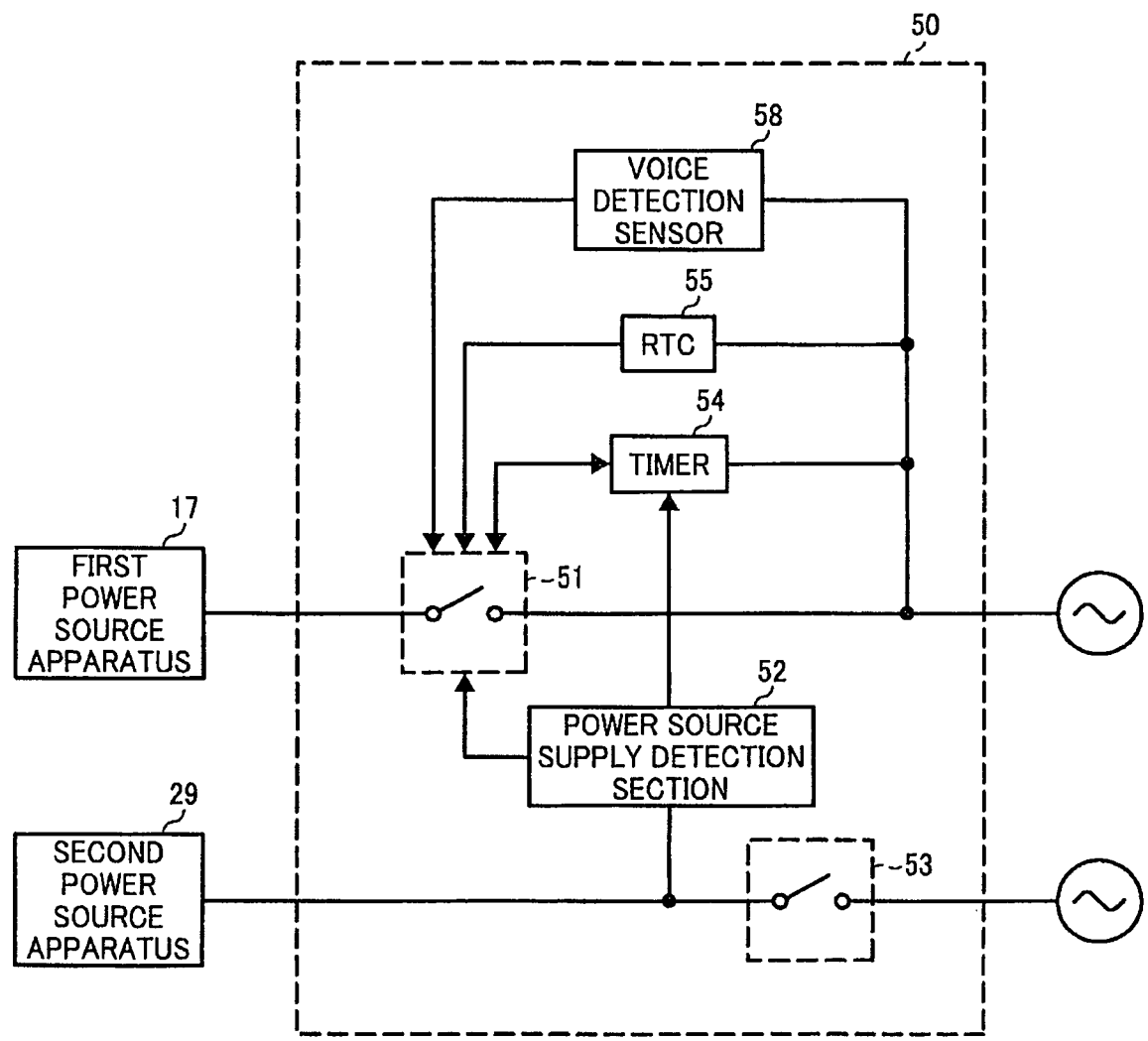
FIG. 9 illustrates still another power source control section according to example embodiments.

Still another example power source control section 50 employs a voice detection sensor 58 to detect voice at around the digital multifunctional machine 1 as shown in FIG. 9. The voice detection section 58 generates and inputs a voice detection signal to the first switch 51 when detecting the voice at around the digital multifunctional machine 1. The first switch 51 starts supplying the external power source to the first power source apparatus 17 and causes the first component section 2 to execute preparatory start up upon receiving the voice detection signal. Thus, similar to the embodiment of FIG. 8, by detecting the employee coming to the work based on the voice detection, a time when the main power source is inputted to the digital multifunctional machine 1 can be predicted.

Still another example power source control section 50 is described with reference to FIG. 10. As shown, a network detection sensor 59 is provided to detect a communication condition of the LAN 41. The client PC 43 of FIG. 2 typically attempts to communicate with apparatus connected to the network 41 by a broadcast or the like to obtain information related to the apparatuses. The network detection sensor 59 detects a signal generated when the client PC 43 starts up and transmits the same as a network detection signal to the first switch 51. The first switch 51 starts supplying the external power source to the first power source apparatus 17 and causes the first component section to execute preparatory start up upon receiving the network detection signal. Thus, similar to the above-mentioned examples, a time when the main power source is inputted to the digital multifunctional machine 1 can be predicted by detecting the employee coming to the office based on the detection of the client PC 43.

Figure 10:
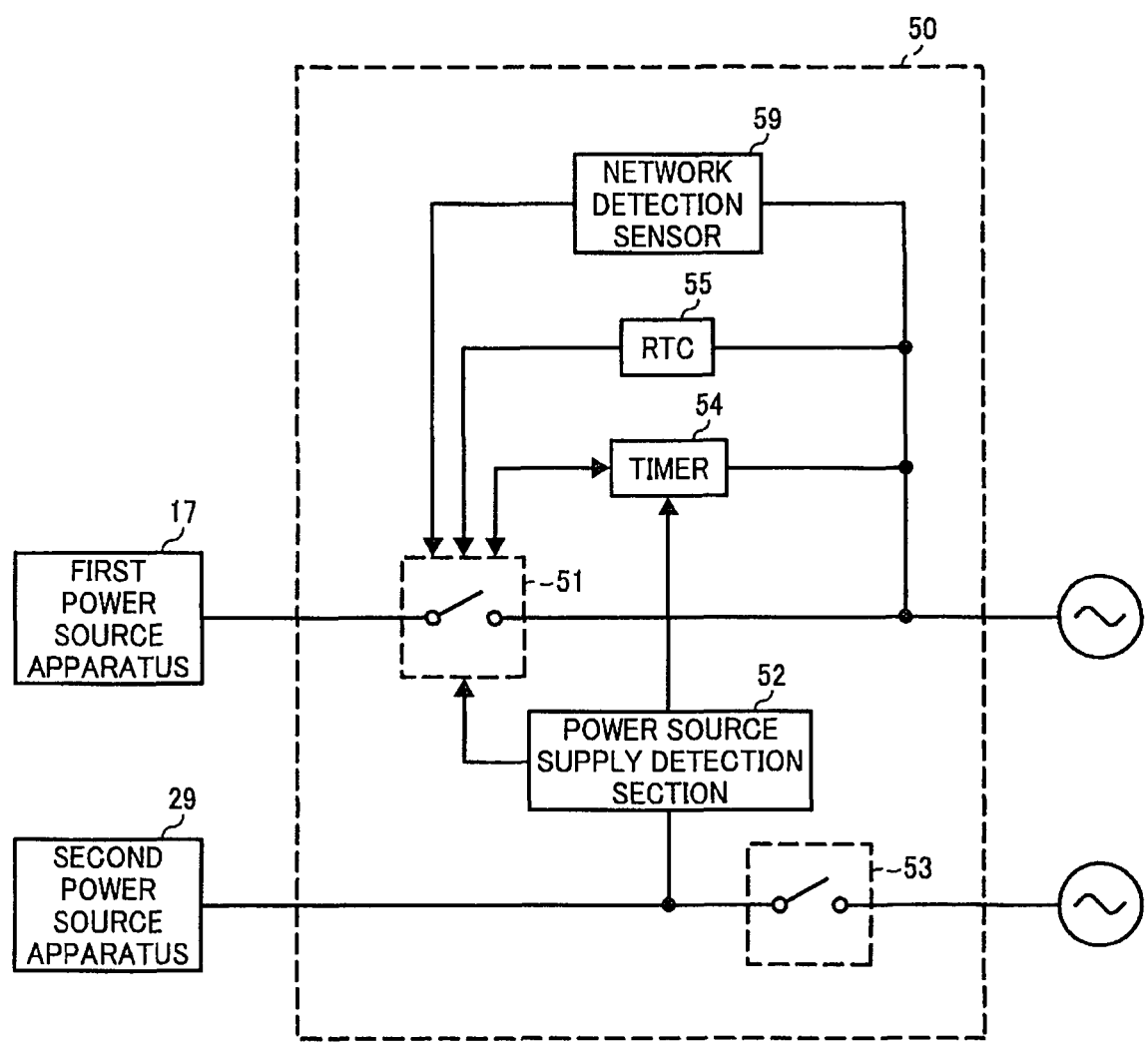
FIG. 10 illustrates still another power source control section according to example embodiments.

For example, the network detection sensor 59 can detect a printing job inputted to the digital multifunctional machine 1 of FIG. 10. For example, the network detection sensor 59 detects a printing job inputted to the digital multifunctional machine 1 and inputs a printing job detection signal to the first switch 51. The first switch 51 starts supplying the external power source to the first power source apparatus 17 and causes the first component section to execute preparatory start up upon receiving the network detection signal. The main power source is sometimes inputted after the printing job is transmitted from the client PC 43 to the digital multifunctional machine 1. In such a situation, if the first component section is started up upon receiving the printing job, an interval between when the main power source is inputted to the digital multifunctional machine 1 and when the apparatus becomes available can be reduced.

Figure 11:
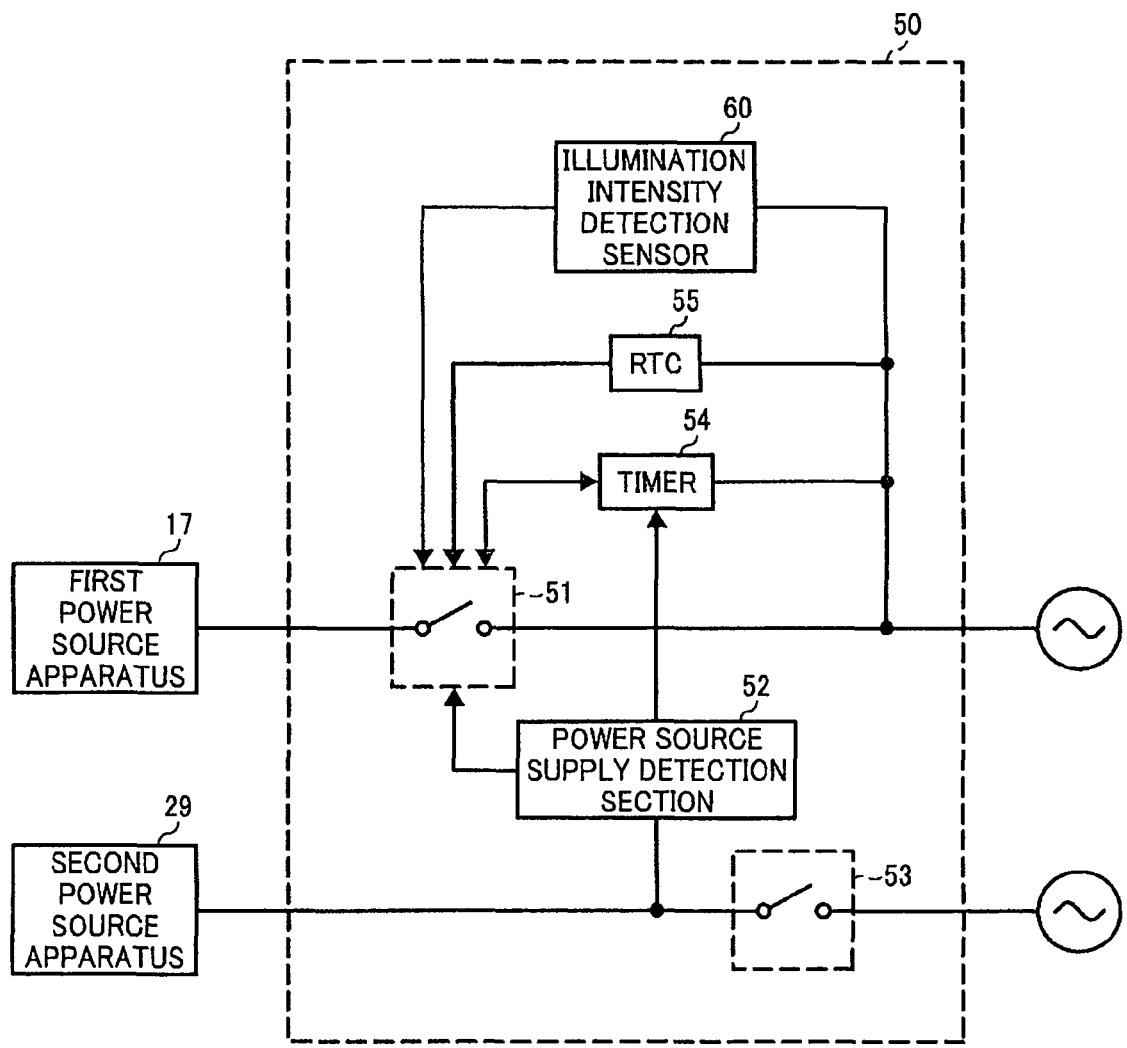
FIG. 11 illustrates still another power source control section according to example embodiments.
Figure 12:
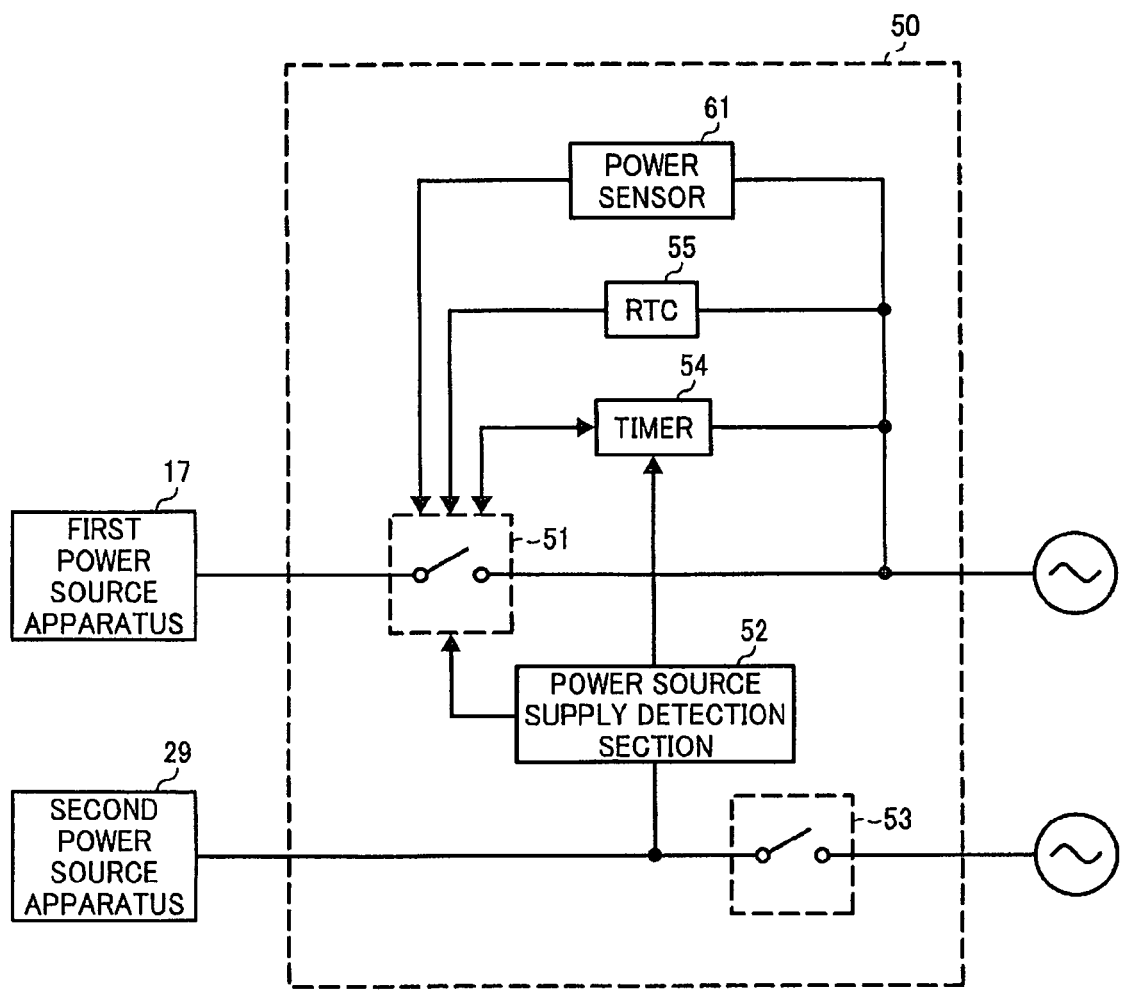
FIG. 12 illustrates still another power source control section according to example embodiments.

Still another example power source control section 50 is described with reference to FIG. 11. As shown, a luminance sensor 60 is provided to detect a luminance at around the digital multifunctional machine 1. The luminance sensor 60 generates and inputs a luminance change detection signal to the first switch 51 when detecting a change in luminance at around the digital multifunctional machine 1. The first switch 51 starts supplying the external power source to the first power source apparatus 17 and causes the first component section 2 to execute preparatory start up upon receiving the luminance change detection signal.

Thus, similar to the above-mentioned example embodiments, by detecting the employee coming to the office based on lightening of a lamp in the office, a time when the main power source is inputted to the digital multifunctional machine 1 can be predicted.

Still another example power source control section 50, a power sensor 61 is provided to detect a power source supply condition of an external power source connected to the digital multifunctional machine 1. The power sensor 61 detects a change in power of the external power source when another apparatus starts up or the like and inputs a power change detection signal to the first switch 51. The first switch 51 starts supplying the external power source to the first power source apparatus 17 and causes the first component section 2 to execute preparatory start up upon receiving the power change detection signal.

Thus, similar to the above-mentioned example embodiments, by detecting the employee coming to the office based on start up of the other apparatus in the office, a time when the main power source is inputted to the digital multifunctional machine 1 can be predicted.

Figure 13:
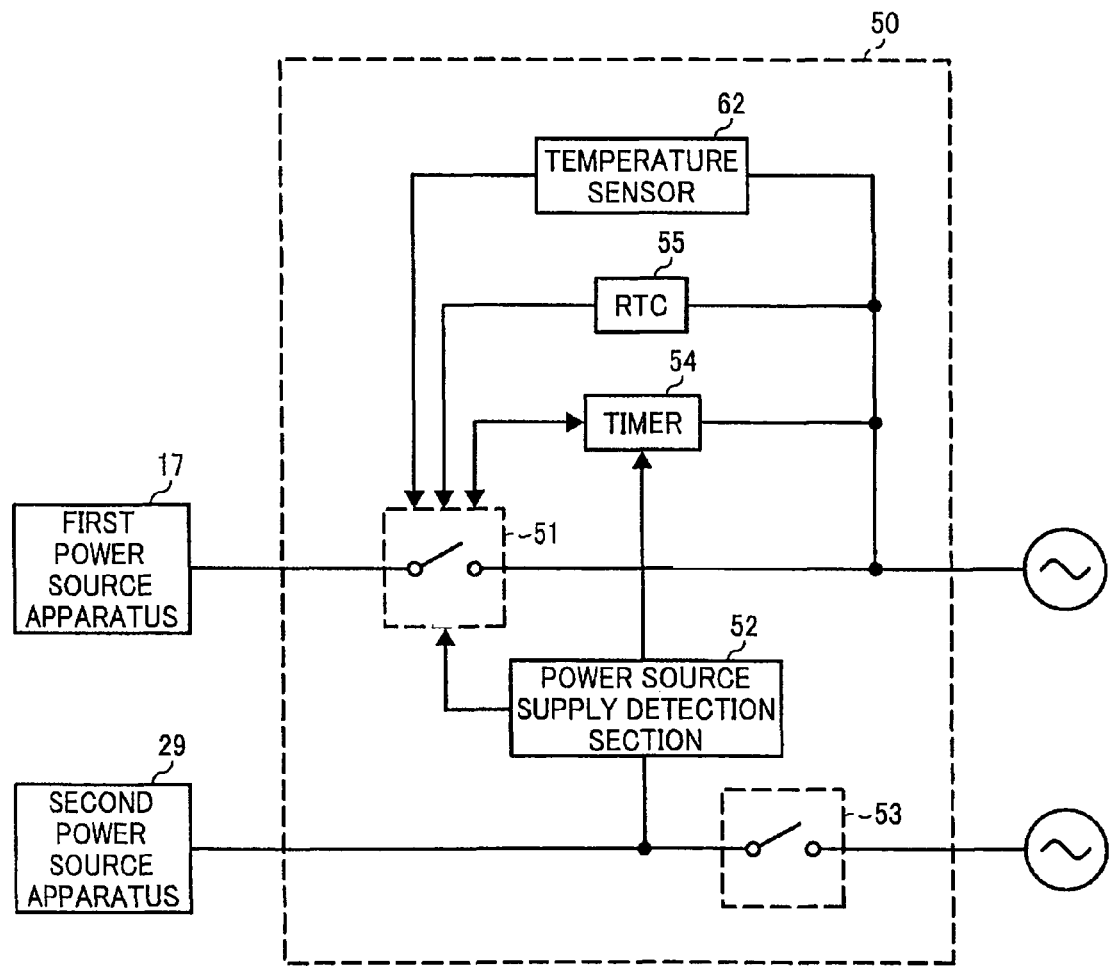
FIG. 13 illustrates still another power source control section according to example embodiments.
Figure 14:
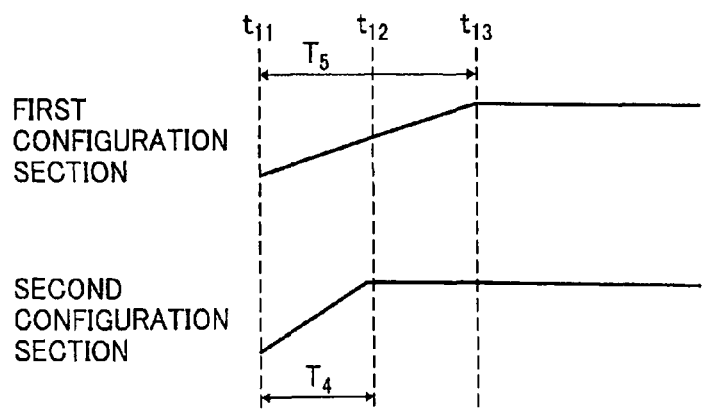
FIG. 14 illustrates a time chart when a conventional digital multifunctional machine starts up.

Still another example power source control section 50 is described with reference to FIG. 13. As shown, a temperature sensor 62 is provided to detect temperature at around the digital multifunctional machine 1. The temperature sensor 61 detects temperature at around the digital multifunctional machine 1 and inputs a temperature detection signal to the first switch 51.

The first switch 51 starts supplying the external power source to the first power source apparatus 17 and causes the first component section to execute preparatory start up upon receiving the temperature detection signal.

For example, air conditioning equipment starts operation when a daily business starts in the office, and thus temperature in the office possibly changes. Accordingly, similar to the above-mentioned example embodiments, a time when the main power source is inputted to the digital multifunctional machine 1 can be predicted by detecting a change in temperature of the office with the temperature sensor 62.

Example embodiments can be applied not only to the above-mentioned multifunctional machines but also to many apparatuses as far as the apparatuses include the above-mentioned first and second components.

Obviously, numerous additional modifications and variations of example embodiments are possible in light of the above teachings. It is therefore to be understood that within the scope of the appended claims, example embodiments may be practiced otherwise than as more specifically described herein.

What is claimed is:

1. A multifunctional machine comprising:
    a first component section configured to start up taking a first time period;
    a second component section configured to start up taking a second time period shorter than the first time period;
    an operation start prediction information obtaining section configured to obtain operation start prediction information predicting a time when a user starts the multifunctional machine;
    a start up control section configured to start up the first component section in advance of the second component section; and
    a power supply control section configured to supply power from at least one external power source and drive the start up control section in accordance with the operation start prediction information, wherein
        said first component section operates in a normal condition and a power save condition, said power save condition consuming less power than the normal condition,
        said start up control section controls the first component section to operate in the power save condition when driven in accordance with the operation start prediction information, and
        a time taken by the first component section to start up after the power save condition is less than a time taken by the second component section to start up when the user starts the multifunctional machine.

2. The multifunctional machine as claimed in claim 1, wherein said operation start prediction information obtaining section obtains a clock time as the prediction information, and
    wherein said power supply control section starts supplying power and drives the start up control section at a prescribed time determined based on the clock time.

3. The multifunctional machine as claimed in claim 2, wherein said prescribed time corresponds to a time when a main power is inputted by the user to the multifunctional machine.

4. The multifunctional machine as claimed in claim 1, further comprising
    a power supply start history accumulation section configured to accumulate information indicating a power supply time when the power is supplied to at least one of the first and second component sections;
        wherein the operation start prediction information obtaining section obtains a clock time as the operation start prediction information, and wherein the power supply control section supplies power and drives the start up control section based on one of the clock time and the power supply time.

5. The multifunctional machine as claimed in claim 1, further comprising
    a start up timer configured to start counting in response to stop of supplying power to at least one of the first and second component sections and configured to transmit a count completion signal when completed counting for a prescribed time period;
        wherein said operation start prediction information obtaining section obtains the count completion signal as the operation start prediction information.

6. The multifunctional machine as claimed in claim 1, further comprising
    a human body detection section configured to detect human body at around the multifunctional machine and configured to transmit a human body detection signal;
        wherein said operation start prediction information obtaining section obtains the human body detection signal as the operation start prediction information.

7. The multifunctional machine as claimed in claim 1, further comprising
    a voice detection section configured to detect voice at around the multifunctional machine and configured to transmit a voice detection signal;
        wherein said operation start prediction information obtaining section obtains the voice detection signal as the operation start prediction information.

8. The multifunctional machine as claimed in claim 1, further comprising
    a network communication condition detection section configured to detect a network communication condition and configured to transmit a network communication signal;
        wherein said operation start prediction information obtaining section obtains the network communication signal as the operation start prediction information.

9. The multifunctional machine as claimed in claim 8, wherein said multifunctional machine performs image formation upon receiving a printing job, and wherein said network detection section transmits the network communication signal by detecting the printing job inputted to the multifunctional machine.

10. The multifunctional machine as claimed in claim 1, further comprising
luminance detection section configured to detect a luminance at around the multifunctional machine and configured to transmit a luminance detection signal;
wherein said operation start prediction information obtaining section obtains the luminance signal as the operation start prediction information.

11. The multifunctional machine as claimed in claim 1, further comprising
a power detection section configured to detect a change in power of the at least one external power source and configured to transmit a power change detection signal;
wherein said operation start prediction information obtaining section obtains the power change detection signal as the operation start prediction information.

12. The multifunctional machine as claimed in claim 1, further comprising
a temperature detection section configured to detect a change in temperature at around the multifunctional machine and configured to transmit a temperature change detection signal;
wherein said operation start prediction information obtaining section obtains the temperature change detection signal as the operation start prediction information.

13. The multifunctional machine as claimed in claim 1, further comprising
a stop control section configured to stop the operation of the first component section when the second component section is not operated when a prescribed time has elapsed after the first component section starts up.

14. The multifunctional machine as claimed in claim 1, further comprising
a stop control section configured to stop the operation of the first component section when the second component section is not operated when a prescribed time has elapsed after the first component section starts up;
wherein said stop control section obtains a clock time and said prescribed time is determined based on the clock time.

15. The multifunctional machine as claimed in claim 1, further comprising:
a stop control section configured to stop the operation of the first component section when the second component section is not operated when a prescribed time has elapsed after the first component section starts up; and
a power supply start history accumulation section configured to accumulate a start time when power supply is started to one of the first and second component sections;
wherein said stop control section obtains a clock time and,
wherein said prescribed time is determined based on one of the clock time and the start time.

16. The multifunctional machine as claimed in claim 1, further comprising:
a stop timer configured to start counting in response to the start of the first component section and configured to stop and transmit a stop count completion signal when completed counting for a prescribed time period;
wherein said stop control section stops operation of the first component section based on the stop count completion signal.

17. A method of controlling a multifunctional machine including a first component section that starts up taking a first time period and a second component section that starts up taking a second time period shorter than the first time period, the method comprising:
obtaining operation start prediction information predicting a time when the multifunctional machine is operated by a user;
starting an operation of the first component section in advance of the second component section based on the operation start prediction information;
supplying power from at least one external power source and starting the operation of the first component section in accordance with the obtained operation start prediction information;
operating the first component section in a normal condition and a power save condition, said power save condition consuming less power than the normal condition;
controlling the first component section to operate in the power save condition when driven in accordance with the operation start prediction information; and
starting up the first component section after the power save condition in a time less than a time taken by the second component section to start up when the user starts the multifunctional machine.

* * * * *